United States Patent [19]
Brenner

[11] 4,131,587
[45] Dec. 26, 1978

[54] PLASTICIZATION OF NEUTRALIZED SULFONATED ELASTOMERIC POLYMER

[75] Inventor: Douglas Brenner, Livingston, N.J.

[73] Assignee: Exxon Research & Engineering Co., Florham Park, N.J.

[21] Appl. No.: 855,547

[22] Filed: Nov. 29, 1977

[51] Int. Cl.² .............................................. C08K 5/18
[52] U.S. Cl. ..................... 260/32.6 A; 260/DIG. 31
[58] Field of Search ...................... 260/79.3 R, 32.6 A

[56] References Cited
U.S. PATENT DOCUMENTS 3,847,854  11/1974  Canter et al. .................. 260/23.7 M Primary Examiner—Lewis T. Jacobs
Attorney, Agent, or Firm—Richard E. Nanfeldt

[57] ABSTRACT

This invention relates to an improved elastomeric composition of metal and ammonium neutralized sulfonated elastomeric polymers which are preferentially plasticized with a critically selected non volatile amine at a minimum critical concentration level of at least 8 parts by weight based on 100 parts by weight of the metal neutralized elastomeric polymer, wherein the plasticized compositions have improved physical or rheological properties. These elastomeric compounds can be processed on conventional plastic fabrication equipment.

9 Claims, No Drawings

PLASTICIZATION OF NEUTRALIZED SULFONATED ELASTOMERIC POLYMER

BACKGROUND OF THE INVENTION

1. Field of the Invention

This invention relates to an improved elastomeric composition of metal and ammonium neutralized sulfonated elastomeric polymers which are preferentially plasticized with a critically selected non volatile amine at a minimum critical concentration level of at least 8 parts by weight based on 100 parts by weight of the metal neutralized elastomeric polymer, wherein the plasticized compositions have improved physical or rheological properties. These elastomeric compositions can be processed on conventional plastic fabrication equipment.

2. Description of the Prior Art

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically crosslinked elastomer having substantially improved physical properties over an unsulfonated elastomer at room temperature. However, these ionically crosslinked elastomers may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of U.S. Pat. No. 3,642,728 are readily useable in a certain number of limited applications, they are not as readily adaptable for the manufacture of an injection moldable elastomeric article such as footwear as are the improved compositions of the present invention, wherein improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically crosslinked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions of this patent are based on plastic backbones, whereas compositions of the present invention are based on elastomeric backbones. The compositions formed by the process of U.S. Pat. No. 3,870,841 are not as suitable for the manufacture of high performance elastomeric articles such as elastomeric tubing formed by an extrusion process as are the compositions of the present invention.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. However, the plasticizers falling within this criterion exhibit a very large range in plasticizing effectiveness so this criterion gives no help in choosing which chemicals will be most effective in improving processability of the sulfonated polymer.

The concentrations of the non volatile plasticizers are limited to an upper concentration of 6-7 parts by weight because with the metal neutralized sulfonated elastomers of this invention, there would be an adverse plasticization of the polymeric backbone. This invention fails to teach, imply or infer the use of the critically selected amines of the instant invention as a preferential plasticizer at high concentrations. The inventive concept of the present instant invention clearly teaches the use of the critically selected amines as a preferential plasticizer at a minimum concentration level of at least about 8 parts per hundred by weight in order to achieve improved rheological or physical properties.

SUMMARY OF THE INVENTION

The present invention relates to improved compositions of metal neutralized sulfonated elastomeric polymers being preferentially plasticized with about 8 to about 75 parts by weight of a critically selected amine based on 100 parts by weight of the metal neutralized EPDM terpolymer, more preferably about 9 to about 40 and most preferably about 10 to about 30. These improved compositions exhibit a spectrum of physical and rheological properties previously simultaneously unattainable by the teachings of the prior art. The compositions of the present invention are processed on conventional plastic fabrication equipment such as extruders into high performance elastomeric articles such as elastomeric base.

Accordingly, it is an object of our present instant invention to provide unique and novel compositions of metal and ammonium neutralized sulfonated elastomeric polymer being preferentially plasticized with a critically selected amine thereby providing high performance elastomeric articles which can be formed on conventional plastic fabricating equipment, wherein the compositions can be optionally modified with fillers, extender oils, waxes or polyolefinic thermoplastics and mixtures thereof.

GENERAL DESCRIPTION

This present invention relates to unique and novel elastomeric compositions of a metal neutralized sulfonated elastomeric polymer being preferentially plasticized with a critically selected amine wherein the compositions can exhibit a substantial improvement in flow properties as well as unexpected and substantial improvements in physical properties. Thus, essentially intractable sulfonated polymer can be made to process readily in conventional molding or extrusion operations.

The metal and neutralized sulfonated elastomeric polymers of this present instant invention are derived from unsaturated polymers which include low unsaturated elastomeric polymers such as Butyl rubber, or EPDM terpolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1 + 8, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Patent 1,030,289 and French Patent 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 45 to about 75 wt. % ethylene, e.g. 50 wt. % and about 2.6 to about 8.0 wt. % diene monomer, e.g. 5.0 wt. %. The diene monomer is preferably a non conjugated diene.

Illustrative of these non conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.) a terpolymer having a Mooney viscosity (ML, 1 + 8, 212° F.) of about 50 and having an ethylene content of about 50 wt. % and a 5-ethylidene-2-norbornene content of about 5.0 wt. %. The $\overline{M}n$ of Vistalon 2504 is about 47,000, the $\overline{M}v$ is about 145,000 and the $\overline{M}w$ is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000; more preferably of about 15,000 to about 100,000; most preferably of about 20,000 to about 60,000. The Mooney viscosity (ML, 1 + 8, 212° F.) of the EPDM terpolymer is about 5 to about 60, more preferably about 10 to about 50, and most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

One means for carrying out the invention, is to dissolve the elastomeric polymer in a non-reactive solvent such as a chlorinated aliphatic hydrocarbon, chlorinated aromatic hydrocarbon, an aromatic hydrocarbon or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about $-10°$ C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophenol, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cyclo aliphatic alcohol such as a cyclohexanol or with water. The acid form of the sulfonated elastomeric polymer has about 10 to about 60 meq. $SO_3H$ groups per 100 grams of sulfonated polymer, more preferably about 15 to about 50; and most preferably about 20 to about 40. The meq. of $SO_3H$/100 grams of polymer is determined by both titration of the polymeric sulfonic acid and Dietert Sulfur analysis. In the titration of the sulfonic acid the polymer is dissolved in a solvent consisting of 95 parts of toluene and 5 parts of methanol at a concentration level of 50 grams per liter of solvent. The acid form is titrated with ethanolic sodium hydroxide to an Alizarin-Thymolphthalein endpoint.

Neutralization of the acid form of the sulfonated elastomer polymer is done, for example, by the addition of a solution of neutralizing agent such as a metal acetate or ammonium bases or amines such as ammonium acetate to the acid form of the sulfonated elastomeric polymer dissolved in the mixture of the aliphatic alcohol and non-reactive solvent. The metal acetate is dissolved in a binary solvent system consisting of water and/or aliphatic alcohol. Typically, but non-limiting metal acetates are sodium acetate, ammonium acetate, barium acetate, magnesium acetate, aluminum acetate, potassium acetate, lead acetate, and zinc acetate, wherein zinc acetate is preferred. Typical amines are the simpler lower molecular weight amines such as methylamine, ethylamine, butylamine, dimethylamine, triethylamine, cyclohexylamine, piperidine and aniline.

Sufficient neutralizing agent is added to the solution of the acid form of the elastomeric polymer to effect neutralization of the $SO_3H$ groups. It is preferable to neutralize at least 95% of the acid group, more preferably about 98%, most preferably 100%. Metal oxides and hydroxides such as ZnO and $Mg(OH)_2$ can also be employed to effect the neutralization of the $SO_3H$ groups.

The resultant neutralized sulfonated terpolymer has a melt viscosity which is dependent upon the molecular weight of the base polymer, the level of sulfonation, and the associated cation. An EPDM with an original Mooney viscosity (ML, 1 + 8, 212° F.) of about 55, containing about 40 meq. sulfonate/100 EPDM and possessing cations such as mercury, magnesium, calcium, cobalt, lithium, barium, sodium and the like may crumble upon exiting from a capillary rheometer at 200° C. at a shear rate of 0.73 sec$^{-1}$ and will possess an apparent viscosity in excess of $5 \times 10^6$ poise. An EPDM with an original Mooney viscosity (ML, 1 + 8, 212° F.) of about 20, containing about 30 meq. sulfonate/100g EPDM, and possessing cations such as zinc, lead, and ammonium possess apparent viscosities of from about $10^6$ to about $10 \times 10^6$ poise at a shear rate of 0.73 sec$^{-1}$ at 200° C. Lower sulfonate contents with amine salts result in apparent viscosities below $1 \times 10^6$ poise under the same testing conditions.

On the other hand the physical properties of the unplasticized sulfonated and neutralized elastomers improve with increasing sulfonate content. Further, metallic cations provide better physical properties than the ammonium or amine cations. Good development of physical properties usually starts to occur when about 20 meq. sulfonate/100g polymer are present, and the physical properties obtained at 30 meq. sulfonate/100g polymer and higher are preferred. However, even at these higher levels of sulfonate the unplasticized neutralized sulfonated elastomers still possess relatively modest physical properties, and the melt viscosities are so high that mixing or processing these gums in the absence of a plasticizer on conventional equipment is extremely difficult if not impossible.

U.S. Pat. No. 3,847,854 addressed itself to the problem of melt processability in metal sulfonate containing elastomers and a large number of materials are claimed as plasticizers that would give the ionomers lower melt viscosities at processing temperatures and thereby permit melt fabrication. However, many of the materials included are relatively poor flow improvers.

U.S. Pat. No. 3,847,854 teaches that the effective flow improvers have an adverse effect on physical properties and therefore directs that no more than 6–7 wt. % of a nonvolatile plasticizer be used above which improvement in melt flow was taught to be associated with a loss in physical properties.

The melt viscosities of the systems investigated herein were determined through the use of a standard melt index apparatus, at 190° C., and generally at 250 psi. Materials possessing a melt index under these conditions of very roughly 0.2g/10 min. or greater can be considered mixable with plasticizers, fillers, extender oils, and other additives in high intensity, high shear rate mixers.

It has been found among a large number of nonvolatile functional organic compounds that a critically selected class of amines provide for markedly improved flow properties and good physical properties. Contrary to the teachings of U.S. Pat. No. 3,847,854 these critically selected amines maintain satisfactory or good physical properties in addition to substantial improvements in melt flow with increasing amine concentration far beyond 8 parts by weight of amine/100 polymer.

Useful amines for the practice of this invention are critically selected from saturated n-alkyl amines, wherein alkyl group has at least about 20 carbon atoms; and mono and di amino as well as aminoalkyl substituted naphthalene compounds and mixtures thereof. Preferred amine plasticizers are arachidylamine, behenylamine, 1,5-diaminonaphthalene and 8 amino-2-naphthol.

In order to exhibit the substantial improvements in processability and physical properties the critically selected amines must at least be solids at room temperatures and preferably possess melting points of 50° C. and higher, most preferably 70° C. or higher.

In order to achieve good melt flow and physical properties it is important to incorporate the critically selected amine into the neutralized sulfonated elastomer at about 8 to about 75 parts by weight per hundred of the sulfonated polymer, more preferably at about 9 to about 50, and most preferably at about 10 to about 30.

Improvements in flow and physical properties are obtainable with a variety of cations. Of the many useful cations, Zn, Pb, Ba, Ca, Mg, K, and Na are preferred. Most preferred is the Zn sulfonate which provides organic amine plasticized gums with good physical properties and ready melt processability.

The amines can be incorporated into the unplasticized gums in a number of ways. One means is the addition of the amide to the cement of the sulfonated and neutralized polymer prior to its isolation during the manufacturing process. The resultant plasticized polymer can still have sufficiently high viscosity and integrity at the usual temperatures of drying so that it could be easily and conveniently dried in a tumble dryer or fluid bed dryer with hot air at for example 100° C. Yet the plasticized polymer can be made to possess sufficiently low viscosity so that it may be dewatered and dried in a dewatering extruder.

Amines can also be added to the gums through the solution of already isolated and dried unplasticized gums and the addition of the amine to this solution. The resultant blend is isolated in the usual manner. Alternatively in cases where the unplasticized gums do not possess too high of a viscosity, it is possible to flux the gum and the amine in high intensity high shear mixers such as Banbury mixers and Farrell continuous mixers.

DESCRIPTION OF THE PREFERRED EMBODIMENTS

EXAMPLE 1 — PREPARATION OF A NEUTRALIZED LIGHTLY SULFONATED POLYMER

An EPDM was used as the backbone elastomeric polymer. It had a composition of about 52 wt. % ethylene, 43 wt. % propylene and 5 wt. % of 5-ethylidene-2-norbornene, and it had a Mooney viscosity M 100° C. (1 + 8 min) of about 20. This base polymer was lightly sulfonated using acetyl sulfate in accordance with the method disclosed in U.S. Pat. No. 3,836,511, to a sulfonate level of about 32 meq. per 100g of base polymer. The acid form of this lightly sulfonated elastomer was neutralized in solution by the addition of excess zinc acetate at a concentration of about 60 meq. per 100g of polymer. This material was steam stripped and then dried in a fluidized bed hot air drier. This material was utilized for the preparation of some of the samples which are described in the following examples. This zinc neutralized lightly sulfonated EPDM was quite tough even at elevated temperatures, and it was too intractable to be fabricated by rapid polymer processing techniques such as extrusion or injection molding.

EXAMPLE 2 — MELT INCORPORATION OF ARACHIDYLAMINE INTO A NEUTRALIZED LIGHTLY SULFONATED POLYMER 45.8g of the neutralized lightly sulfonated polymer in a crumb form prepared in Example 1 was briefly mixed in a beaker with a spatula with 8.2g of powdered arachidylamine. This was a concentration of 60 meq. of arachidylamine per 100g of gum, or 15.2 wt. % additive. This blend was added to a Brabender Plasticorder having a 60 cc mixing head with Banbury mixers. The material was mixed at 160° C. and 50 RPM. Very rapidly the material fused into a coherent melt which mixed very well in the mixing head and resulted in excellent dispersion of the additive. Six minutes after the addition of the blend to the mixer had been completed, mixing was terminated. Then the material was sheeted out by a single pass through a two-roll mill having about a 0.040 inch roll separation.

EXAMPLE 3 — PREPARATION OF TEST SAMPLES, AND MEASUREMENT OF FLOW AND TENSILE PROPERTIES OF A LIGHTLY SULFONATED EPDM PLASTICIZED WITH VARIOUS SUBSTITUTED AMINES AT HIGH CONCENTRATIONS

Various substituted amines were incorporated into samples of the neutralized sulfonated EPDM described in Example 1, using procedures similar to those described inExample 2. Good mixing was obtained in each case, and homogeneous materials were produced in each mix. Test pads were made from each of these samples prepared in Example 2, by compression molding at 350° F. The procedure was to preheat the empty mold plates in the press for a few minutes, then the material was put in the mold and the mold containing the material was preheated in the press with the mold plates slightly open for two minutes. Then the mold plates were pressed closed under a force of about 20 tons for two minutes. The samples were cooled in the molds under pressure for two minutes. Microtensile pads having a thickness of about 0.6 mm and test regions measuring 2.54 mm in width and 12.7 mm in length were cut from the test pads with a die. The samples were stored in closed dry bottles for one or more days prior to tensile testing.

Tensile strengths of the samples were measured with an Instron TM table model instrument, using a pulling speed of 51 mm per minute. Measurements were made at room temperature (25° C.), and also at a higher temperature to determine the usefulness of the materials at elevated temperature. In the measurements at elevated temperature, after being placed in the testing oven, a 3 minute waiting period was allowed before pulling to enble the sample to equilibrate with the oven temperature. The elevated temperature utilized in most measurements was 70° C.

Melt flow rates for the various materials were determined at 190° C. which is in the range of typical processing temperatures for lightly sulfonated EPDM. The melt index instrument specified in ASTM 1238-70 was used, with the standard capillary. The weight of the probe plus the added weight was 12.5 kilograms. Flow rates were measured electronically as probe displacement per minute, and these results were converted to grams per 10 minutes using a conversion factor.

The melt flow rates and tensile properties for the plasticized lightly sulfonated EPDM samples are shown in Table I. These results show that a lightly sulfonated EPDM material plasticized with high concentrations of various substituted amines result in much improved melt flow rates, over 30 times that of the nonplasticized gum, resulting in much better processability at fabrication temperatures. It can also be seen from Table I that the room temperature tensile strengths are far above that of the nonplasticized sulfonated gum. In particular, the room temperature tensile strengths of the 1,5 diaminonaphthalene and 8-amino-2-naphthol are extremely outstanding. Likewise, even at 70° C. tensile strengths of these two additives are far better than the nonplasticized gum. Since these materials are thermoplastic elastomers and have good melt flow at processing temperatures (say, 190° C.), such high tensile strengths of nearly 900 psi at this elevated temperature are quite outstanding. The gum plasticized with the arachidylamine is recommended for applications which will involve use in the vicinity of room temperature, or for low temperature applications because of its poor strength at 70° C. Presumably the poor strength of the arachidylamine at 70° C. is a result of its relatively low melting point.

This example includes a hydroxyaminonaphthalene. It is remarkable how close the properties of this hydroxy substituted naphthalene are to the properties of the 1,5-diaminonaphthalene reported in Table I. Since the monohydroxy functionality is a considerably less effective melt flow improver for these materials than the amine functionality (e.g. see Table VI), it appears that the presence of the hydroxy functionality doesn't affect melt flow properties much, though it does have an important effect on the temperature of onset of phase separation of the additive. Also, in view of the similarity in the properties of these two substituted naphthalenes, it seems that in the 1,5-diaminonaphthalene only one of the amine substituents is being very effective in promoting melt flow of the sulfonated elastomer. However, the presence of the second amine group would have an important effect on the temperatures of phase separation of the additive.

This example illustrates that high concentrations of various substituted amines at well above the levels taught to be detrimental by prior art can give an outstanding balance of excellent tensile properties at use temperature combined with satisfactory melt flow at processing temperature.

TABLE I
Tensile and Melt Flow Properties Of A Sulfonated EPDM Plasticized With Various Substituted Amines At High Concentrations

| | | | Tensile Properties[2] | | | | | |
|---|---|---|---|---|---|---|---|---|
| | | | 25° C | | | 70° C | | |
| Additive | Conc. Wt. % | Melt Flow Rate[1] (g/10 min) | Strength (psi) | Elong. (%) | Initial Modulus[3] (psi) | Strength (psi) | Elong. (%) | Initial Modulus (psi) |
| Arachidylamine | 15.2 | 1.5 | 1520 | 585 | 815 | 42 | 740 | 155 |
| 1,5-diaminonaphthalene | 15.1 | 0.27 | 3460 | 520 | 1055 | 895 | 570 | 760 |
| 8-amino-2-naphthol | 14.8 | 0.23 | 3700 | 500 | 975 | 880 | 600 | 615 |
| None | — | 0.007 | 650 | 250 | 385 | 305 | 310 | 310 |

[1]ASTM 1238–70, Standard Capillary, 190° C, 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.

EXAMPLE 4 — A CLASS OF AMINES NOT GIVING GOOD MELT FLOW AS ADDITIVES AT HIGH CONCENTRATIONS TO A SULFONATED EPDM

Two samples of neutralized sulfonated EPDM prepared in the manner described in Example 1, were plasticized with N,N'diphenyl-p-phenylenediamine, and with triphenylamine in the Brabender Plasticorder described in Example2. The concentrations were 15.6 and 13.2 wt. percent respectively. In the mixing of these additives into the non-plasticized gum, the material was slow to fuse, and when fusion occurred the melts were quite tough and they tended to break into chunks during mixing rather than forming a smooth coherent melt within the mixer. Also, mixing times tended to be longer with these tough materials. However, in spite of the mixing difficulties, it appeared that satisfactory homogeneity was obtained in the mix, and the materials removed from the mixer appeared to be uniform. Melt flow measurements were made at 190° C. for these materials according to the procedures of Example 3.

The melt flow rates measured for N,N'diphenyl-p-phenylenediamine, and triphenylamine are listed in Table II. The flow rates are quite low — less than one-quarter of the lowest value for a plasticized material in Table I. This example shows a class of amines which has relatively poor effectiveness as a melt flow improver. In the N,N'diphenyl-p-phenylenediamine both of the nitrogen atoms are attached to two phenyl rings. In the triphenylamine, of course, the nitrogen atom is attached to three phenyl rings. Apparently, when the nitrogen atom is attached to two or more phenyl rings it becomes a less effective melt flow improver.

TABLE II
Some Types Of Amines Not Giving Good Melt Flow As Additives At High Concentrations To a Sulfonated EPDM

| Additive | Concentration (mmoles/100g of gum) | Wt. % | Melt Flow Rate[1] (g/10 min) |
|---|---|---|---|
| N,N'diphenyl p-phenylenediamine | 71 | 15.6 | 0.055 |
| Triphenylamine | 62 | 13.2 | 0.014 |

[1]ASTM 1238–70, Standard Capillary, 190° C, 250 psi

EXAMPLE 5 — SOME SELECTED AMINES GIVING RELATIVELY LOW TENSILE STRENGTH AS ADDITIVES AT HIGH CONCENTRATIONS TO A SULFONATED EPDM

Samples of neutralized sulfonated EPDM prepared in the manner described in Example 1, were plasticized at high concentrations with various substituted amines in the manner described in Example 2. Melt flow and tensile measurements were made according to the procedures of Example 3. Results for these materials are shown in Table III. The materials listed in Table III are some amines which were found to have relatively low room temperature tensile strength. Three of these materials show unusually high melt flow rates at 190° C.; however, they also have unusually low tensile strength. Apparently the cause of the relatively low room temperature tensile strengths for these materials is that they continue to be very effective plasticizers even at room temperature. All of these four additives have melting points either only slightly above room temperature or below room temperature, and apparently at room temperature where the tensile measurements were made they are not appreciably phase separated from the polymer phase, so they continue to interact with and strongly plasticize the ionic polymer. This causes the materials to yield and break at relatevey low forces. Di and tri alkyl amines seem to be particularly effective melt flow improvers for sulfonated EPDM; this is noteworthy in view of their relatively low dipole moments. However, many of the di and tri alkyl amines have relatively low melting points and they are not appreciably phase separated from the polymer at room temperature. These additives also seem to have more difficulty phase separating from the EPDM than the normal amines — perhaps because their structure makes proper packing more difficult so that their phase separation as a dispersed solid from the polymer phase often tends to occur further below their melting point than for normal alkyl amines. For these reasons di and tri alkyl amines in sulfonated elastomers are more suited to applications not requiring substantial strength, such as in caulking and coating applications or in solution applications.

In the case of the dodecylamine it appears that its chain length is too short to give very good tensile strength at room temperature. Longer chain length normal saturated amines, such as the arachidylamine (20 carbon chain) included in Table I give good tensile strength at room temperature, combined with good melt flow at processing temperatures.

full sample was removed from the mixing head and sheeted out with a single pass through a 100° C. 2 roll mill having a roll separation of about 0.04 inches.

The concentrations of the 1,5-diaminonaphthalene were 2.4, 5.2, and 15 wt. % and the concentrations of the 8-amino-2-naphthol were 2.4, 5.6 and 15 wt. %. Satisfactory mixing was achieved at all concentrations, though, for each additive the melt was considerably tougher and more difficult to mix at the lowest concen-

TABLE III
Some Types Of Amines Giving Good Melt Flow But Relatively Low Tensile Strength As Additives At High Concentrations To A Sulfonated EPDM

| | Concentration | | Melt Flow Rate[1] (g/10 min) | Tensile Properties[2] Room Temperature | | |
|---|---|---|---|---|---|---|
| Additive | (Mmoles/100g gum) | Wt. % | | Strength (psi) | Elong. (%) | Initial Modulus[3] (psi) |
| Dodecylamine | 60 | 10.0 | 0.86 | 485 | 665 | 275 |
| Didodecylamine | 60 | 17.6 | 9.2 | 49 | >750 | 135 |
| N-methyl-octadecylamine | 60 | 14.6 | 6.7 | 74 | >1000 | 235 |
| Tri-n-octylamine | 60 | 17.6 | 13.0 | 42 | 700 | 150 |

[1]ASTM 1238-70, Standard Capillary, 190° C, 250 psi.
[2]Microdumbbell about 22 mils thick, 0.1 inch wide, 0.5 inch long straight test region. Pulled at 2 inches/minute.
[3]Modulus determined from initial steepest slope of the stress-strain curve.

EXAMPLE 6 — PHYSICAL PROPERTIES AS A FUNCTION OF CONCENTRATIONS FOR SOME SUBSTITUTED AMINES IN A SULFONATED EPDM

Samples of neutralized sulfonated EPDM prepared in the manner described in Example 1 were plasticized with various levels of two substituted amines, 1,5-diaminonaphthalene and 8-amino-2-naphthol, in the Brabender mixing head described in Example 2. The different concentrations of each sample were prepared as follows. For the lowest levels of each of these additives, 37g of the nonplasticized gum described in Example 1 was added to the mixing head, and then 0.9g of the additive was added. A mixing speed of 50 RPM was used for almost all of the mixing in the Brabender mixing head. For each additive, mixing was started at 160° C. but because of their higher melting points, temperatures of up to 210° C. were used for short times during the mixing procedures. About 3 minutes after adding each of the materials, they were mixing well and were well homogenized. At this point for each additive a small sample of about 6g was removed from the melt thru the gate of the mixing head. Then an additional 1.88g of the particular plasticizer was added and additional nonplasticized sulfonated EPDM gum was added to fill the mixing head. This material was mixed until it was mixing well and the torque reading had stabilized; usually this took about 3 minutes, and then a second sample of about 6g was removed from the mixing head. Calculations of wt. % additive for these samples took into consideration the sample previously removed as well as the additional additive and nonplasticized gum added after the earlier sample was taken. After the second sample was removed and weighed, an additional 5.25g of the particular additive was added and also additional nonplasticized gum to adequately fill the Brabender mixing head so that the gate was just barely bouncing. The amount of nonplasticized gum needed was determined by running the mixing head for a short time (roughly 15 seconds) and observing whether the gate was bouncing slightly — indicating a filled mixing head. After about 3 minutes mixing at this highest concentration for each additive, the mixing torque had stabilized, the sample was well homogenized, and the tration. Tensile properties, and melt flow rates at 190° C. are shown in Table IV, along with the nonplasticized sulfonated gum for reference.

This example shows that as the concentration of additive is increased for these plasticizers there is a dramatic increase in the melt flow rate. Higher flow rates are very desirable for rapid fabrication techniques, such as the high speed extrusion of articles, and for fast cycle times and adequate mold filling in injection molding operations. The higher melt flow rates resulting from the high concentrations of additives also result in correspondingly greater melt flow rates in compounds made from these gums — such as, for example, compounds with oil and fillers, or blends with plastics. Thus, a substantial gain in processability of compounds is achieved through the use of high concentrations of these plasticizers, in the same way as a substantial gain in processability of the gums was illustrated in this example.

For the 1,5-diaminonaphthalene additive the tensile properties were also measured at all three concentrations. It is remarkable that at the highest concentration of 15 wt. % the tensile strength is over 50% greater than at the lower concentrations. This behavior is quite unexpected in view of prior art which clearly teaches that concentrations of 6% or above are detrimental to physical properties. Not only is the high concentration not detrimental, but it results in a very large improvement in tensile strength. The very excellent tensile strength combined with the improved melt flow rate result in an outstanding balance of tensile and rheological properties for this material at this high concentration of additive.

TABLE IV
Melt Flow And Tensile Properties Of A Sulfonated EPDM Gum[4] Plasticized With Some Substituted Amines At Different Concentrations

| | | Melt Flow Rate[1] (g/10 min) | Tensile Properties[2] Room Temperature | | |
|---|---|---|---|---|---|
| Additive | Conc. Wt. % | | Strength (psi) | Elong. (%) | Initial Modulus[3] (psi) |
| 1,5-diamino-naphthalene | 2.4 | 0.017 | 2245 | 430 | 670 |

TABLE IV-continued

Melt Flow And Tensile Properties Of A Sulfonated EPDM Gum[4] Plasticized With Some Substituted Amines At Different Concentrations

| Additive | Conc. Wt. % | Melt Flow Rate[1] (g/10 min) | Tensile Properties[2] Room Temperature | | |
|---|---|---|---|---|---|
| | | | Strength (psi) | Elong. (%) | Initial Modulus[3] (psi) |
| 1,5-diamino-naphthalene | 5.2 | 0.063 | 2260 | 450 | 715 |
| 1,5-diamino-naphthalene | 15. | 0.27 | 3460 | 520 | 1055 |
| 8-amino-2-naphthol | 2.4 | 0.023 | " | " | " |
| 8-amino-2-naphthol | 5.6 | 0.10 | " | " | " |
| 8-amino-2-naphthol | 15. | 0.24 | 3700 | 500 | 975 |
| None | — | 0.007 | 650 | 250 | 385 |

[1]ASTM 1238-70, Standard Capillary, 190° C. 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.
[4]The nonplasticized gum is the material described in Example 1; (zinc neutralized, 32 meq. of sulfonation per 100g of gum).

EXAMPLE 7 — TENSILE PROPERTIES AS A FUNCTION OF TEMPERATURE FOR A SULFONATED EPDM CONTAINING DIFFERENT ADDITIVES AT HIGH CONCENTRATION

The neutralized sulfonated EPDM described in Example 1 was plasticized with about 15 wt. % of 1,5-diaminonaphthalene in the Brabender mixing head described in Example 2. Tensile measurements were made over a range of temperatures from room temperature up to 120° C. using the procedures described in Example 3. Results are shown in Table V. For comparison, results for stearic acid, a commonly used organic plasticizer for sulfonated EPDM, are also shown. It is seen from Table V, that in spite of the high level of 1,5-diaminonaphthalene present in the sulfonated EPDM excellent tensile strengths are obtained for this material up to 100° C. Even at 120° C. the tensile strength is over 100 psi; this is a very respectable strength for this thermoplastic elastomer considering that at 190° C. the material is readily melt processable (e.g. see melt flow rate at 190° C. in Table I). In comparison, the frequently used plasticizer stearic acid has a tensile strength of far below 100 psi at a temperature of 70° C. This example illustrates the relatively outstanding tensile properties of 1,5-diaminonaphthalene at high temperature.

TABLE V

Tensile Properties As A Function Of Temperature For A Sulfonated EPDM Containing Different Additives

| Additives | Conc. Wt. % | Temperature (° C) | Tensile Properties[1] | | |
|---|---|---|---|---|---|
| | | | Strength (psi) | Elong. (%) | Initial Modulus[2] (psi) |
| 1,5-diamino-naphthalene | 15.1 | 25 | 3460 | 520 | 1055 |
| 1,5-diamino-naphthalene | " | 70 | 895 | 570 | 760 |
| 1,5-diamino-naphthalene | " | 100 | 270 | 610 | 500 |
| 1,5-diamino-naphthalene | " | 120 | 107 | 120 | 345 |
| Stearic acid | 14.6 | 25 | 1070 | 545 | 617 |
| Stearic acid | " | 70 | 55 | 1020 | 155 |

[1]Microdumbbell, about 22 mils thick, 0.1 inch wide, 0.5 inch long straight test region. Pulled at 2 inches/minute.
[2]Modulus determined from initial steepest slope of the stress-strain curve.

EXAMPLE 8 — COMPARISON OF PROPERTIES OF SULFONATED EPDM GUMS PLASTICIZED WITH HIGH CONCENTRATIONS OF VARIOUS FUNCTIONAL TYPES HAVING LONG ALKYL CHAINS

Samples of the nonplasticized gum described in Example 1 were mixed with high concentrations of additives having various different functional groups. Each of these additives contained a long alkyl chain to insure reasonably good compatability with the gum at processing temperatures. The functional groups in Table VI include amine, ester, ketone, phthalate, alcohol, and nitrile as well as a $C_{18}$ wax for reference. Each material was incorporated in the nonplasticized lightly sulfonated EPDM prepared in Example 1, at a concentration of 60 meq. per 100g of gum. The procedure described in Example 2 was used for incorporating the additives into the nonplasticized gum. The mixes which resulted in very low melt flow rate compositions (see Table VI) were difficult to mix and required longer times (perhaps 10 minutes or slightly longer) in the Brabender mixer. Also, these low melt flow rate compositons tended to mix as chunks rather than forming a coherent sheet or melt within the mixer. For example, the nitrile and ketone plasticized samples were particularly difficult to mix. However, it appeared that adequate dispersion of the additive in each of the samples was accomplished, and the material removed from the mixer appeared to be uniform in all cases. Melt flow rates and tensile measurements were made on each of the samples using the procedures described in Example 3. The results are shown in Table VI.

The six additives with functional groups shown here all have dipole moments well above 0.6 Debyes, so the prior art does not distinguish between which will be the more effective additives; yet, when used at identical molar concentrations there is a difference of about a factor of 75 between the poorest and the best flow improver here.

These results show that numerous organic chemicals having high dipole moments are relatively poor as melt flow improvers when used at high concentrations in a sulfonated elastomer. It is noteworthy that the amine in Table VI has one of the lowest dipole moments of the functional groups listed there, yet it is the most effective plasticizer by far.

TABLE VI

Comparison Of Various Functional Types With Long Alkyl Chains As Additives To A Zinc Neutralized Sulfonated EPDM

| Additive | Concentration (meq/100g gum) | Wt. % | Melt Flow Rate[1] (g/10 min) | Tensile Properties[2] Room Temperature | | Initial Modulus[3] (psi) |
|---|---|---|---|---|---|---|
| | | | | Strength (psi) | Elong. (%) | |
| Arachidylamine | 60 | 15.2 | 1.5 | 1520 | 585 | 815 |
| Butylstearate | 60 | 17.0 | 0.10 | 670 | 480 | 300 |
| 6-undecanone | 60 | 9.3 | 0.02 | 620 | 310 | 395 |
| Didodecyl phthalate | 60 | 23.1 | 0.15 | 555 | 425 | 265 |
| Octadecylalcohol | 60 | 13.9 | 0.36 | 1300 | 490 | 475 |
| Stearonitrile | 60 | 13.7 | 0.15 | 770 | 495 | 370 |
| Octadecane | 60 | 13.3 | 0.19 | 720 | 410 | 375 |
| None | — | — | 0.007 | 650 | 250 | 385 |

[1]ASTM 1238-70, Standard Capillary, 190° C, 250 psi.
[2]Microdumbbell, about 22 mils thick, 0.1 inch wide, 0.5 inch long straight test region. Pulled at 2 inches/minute.
[3]Modulus determined from initial steepest slope of the stress strain curve.

Since many modifications and variations of this invention may be made without departing from the spirit or scope of the invention thereof, it is not intended to limit the spirit or scope thereof to the specific examples thereof.

What is claimed is:

1. An elastomeric composition including:
   (a) a neutralized sulfonated elastomeric polymer having about 15 to 60 meq metal sulfonate groups per 100 grams of said sulfonated elastomeric polymer; and
   (b) at least about 10 parts by weight of an organic amine based on 100 parts of said neutralized sulfonated elastomeric polymer, wherein said amine is selected from the group consisting of mono and di-substituted amino naphthalene compounds, amino alkyl naphthalene compounds, and saturated n-alkyl amines and mixtures thereof, wherein the alkyl groups of said n-alkylamine has at least about 20 carbon atoms.

2. A composition according to claim 1, wherein said neutralized sulfonated elastomeric polymer is formed from an elastomeric polymer selected from the group consisting of Butyl rubber and an EPDM terpolymer.

3. A composition according to claim 2, wherein said EPDM terpolymer consists essentially of about 40 to about 80 wt. % of ethylene, of about 10 to about 53 wt. % of propylene and of about 1 to about 10 wt. % of a nonconjugated diene.

4. A composition according to claim 3, wherein said non conjugated diene is selected from the group consisting of 1,4-hexadiene, dicyclopentadiene, alkylidene substituted norbornenes, alkenyl substituted norbornenes and tetrahydroindene.

5. A composition according to claim 4, wherein said non conjugated diene is 5-ethylidene-2-norbornene.

6. A composition according to claim 1, wherein said metal cation of said metal neutralized sulfonated polymer is selected from the group consisting of Groups I-A, II-A, I-B and II-B, lead, antimony and iron of the Periodic Table of Elements.

7. A composition according to claim 1, wherein said amine is 1,5-diamino naphthalene, 8-amino-2-naphthol, arachidylamine and behenylamine.

8. A composition according to claim 1, wherein said amine has a melting point of at least about 70° C.

9. A composition according to claim 1, wherein said metal cation is zinc.

* * * * *